United States Patent
Deeter et al.

(10) Patent No.: US 9,846,726 B2
(45) Date of Patent: Dec. 19, 2017

(54) SAVED QUERIES IN A SOCIAL NETWORKING SYSTEM

(71) Applicant: Facebook, Inc., Menlo Park, CA (US)

(72) Inventors: Ken Deeter, San Carlos, CA (US); Thomas Stocky, Los Altos, CA (US); Robyn David Morris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/866,526

(22) Filed: Sep. 25, 2015

(65) Prior Publication Data

US 2016/0019263 A1  Jan. 21, 2016

Related U.S. Application Data

(60) Continuation of application No. 14/576,050, filed on Dec. 18, 2014, now Pat. No. 9,177,016, which is a division of application No. 13/729,954, filed on Dec. 28, 2012, now Pat. No. 8,954,455.

(51) Int. Cl.
*G06F 17/30* (2006.01)
*G06Q 50/00* (2012.01)
*H04L 29/08* (2006.01)

(52) U.S. Cl.
CPC .. *G06F 17/30477* (2013.01); *G06F 17/30289* (2013.01); *G06F 17/30371* (2013.01); *G06F 17/30424* (2013.01); *G06F 17/30864* (2013.01); *G06Q 50/01* (2013.01); *H04L 67/10* (2013.01); *H04L 67/22* (2013.01); *H04L 67/306* (2013.01)

(58) Field of Classification Search
USPC ............... 707/767, 755, 779, 741, 736, 760
See application file for complete search history.

(56) References Cited

U.S. PATENT DOCUMENTS

| | | | |
|---|---|---|---|
| 6,904,433 B2 | 6/2005 | Kapitskaia et al. | |
| 7,403,938 B2 | 7/2008 | Harrison et al. | |
| 8,566,340 B2 * | 10/2013 | Udupa | G06F 17/30646 707/767 |
| 8,954,455 B2 | 2/2015 | Deeter et al. | |
| 2005/0203878 A1 * | 9/2005 | Brill | G06F 17/3064 |
| 2005/0267871 A1 | 12/2005 | Marchisio et al. | |
| 2008/0005073 A1 * | 1/2008 | Meek | G06F 17/30867 |
| 2008/0065587 A1 * | 3/2008 | Iwasaki | G06F 3/0614 |
| 2008/0086439 A1 | 4/2008 | Brough et al. | |
| 2009/0019020 A1 | 1/2009 | Dhillon et al. | |
| 2011/0296004 A1 * | 12/2011 | Swahar | G06F 17/3053 709/224 |
| 2013/0074186 A1 * | 3/2013 | Muttik | G06F 21/51 726/24 |

\* cited by examiner

*Primary Examiner* — Hung T Vy
(74) *Attorney, Agent, or Firm* — Fenwick & West LLP

(57) ABSTRACT

A user saves a structured query defining connections between two or more objects maintained by a social networking system. The social networking system finds objects matching the structured query, either by periodically performing searches for new objects or by analyzing objects as they are added or modified. The user creating the saved query can subsequently view the matching objects.

19 Claims, 9 Drawing Sheets

US 9,846,726 B2

SAVED QUERIES IN A SOCIAL NETWORKING SYSTEM

CROSS REFERENCE TO RELATED APPLICATIONS

This application is a continuation of U.S. application Ser. No. 14/576,050, filed on Dec. 18, 2014, which is a division of co-pending U.S. application Ser. No. 13/729,954, filed Dec. 28, 2012, now U.S. Pat. No. 8,954,455, which are incorporated by reference in their entirety.

BACKGROUND

This invention relates generally to searching for objects in a social networking system, and more particularly to maintaining a structured search query.

Social networking systems allow users to interact with each other by creating user profiles, forming connections to other users, posting content items, and sharing content items. The number of user profiles, content items, and connections increases as the social networking system gains users and increases in popularity. Accordingly, users who are active on the social networking system can view a large number of user profiles and content items.

Using an especially active social networking system may result in a large volume of content items, user profiles, and other activity being presented to a user, which may overwhelm the user with information. Hence, the user may be flooded with content that the user does not find interesting or relevant, making it difficult for the user to identify content of interest. While some social networking systems allow a user to search for a specific item or for items matching a keyword, they do not allow the user to perform a structured search for content items or user profiles based on their connections to other content items or user profiles.

SUMMARY

A social networking system allows a user to save a structured query defining connections between two or more objects maintained by the social networking system. After saving the structured query, the social networking system finds objects matching the structured query and maintains a list of the matching objects. In one embodiment, an identifier for the query is stored in a reverse index based on the properties of the objects defined in the structured query. When the social networking system receives a new action, the saved query module extracts objects from the action and uses the reverse index to determine whether the extracted objects match a saved query. If an object matches a saved query, a link to the object is added to a list of matching objects for the saved query and the user creating the query may view the matching object. In another embodiment, the social networking system periodically performs a search for objects matching the structured query and updates the list of matching objects to include any new objects that are found.

In some embodiments, a user creates the saved query by providing a search phrase defining a connection between two objects to the social networking system. The search phrase is parsed to generate a structured query comprising search objects representing the objects in the search phrase. The structured query is then saved in association with the user.

The reverse index may have a tree structure organizing query identifiers based on properties of the search objects in the corresponding structured queries. The tree structure allows identification of queries matching a given object by traversing the tree structure according to information in the given object and in objects connected to the given object.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1A:
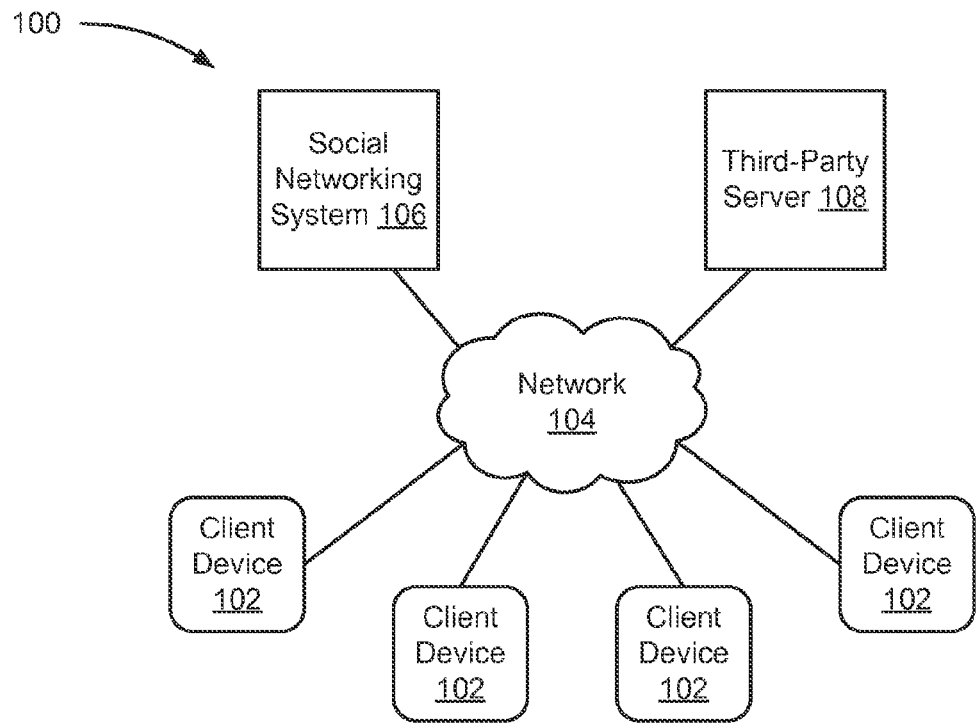
FIG. 1A is block diagram of a system environment for a social networking system, according to one embodiment.

FIG. 1A is a block diagram of one embodiment of a system environment 100 for a social networking system 106. The system environment 100 comprises one or more client devices 102, a network 104, the social networking system 106, and one or more third-party severs 108. In alternative configurations, different and/or additional components may be included in the system environment 100. The embodiments described herein can also be adapted to online systems that are not social networking systems.

The client devices 102 comprise one or more computing devices capable of receiving user input as well as transmitting and/or receiving data via the network 104. In one embodiment, a client device 102 is a conventional computer system, such as a desktop or laptop computer. In another embodiment, a client device 102 may be a device having computer functionality, such as a personal digital assistant (PDA), mobile telephone, smart-phone or similar device. A client device 102 is configured to communicate via the network 104. In one embodiment, a client device 102 executes an application allowing a user of the client device 102 to interact with the social networking system 106. For example, a client device 102 executes a browser application to enable interaction between the client device 102 and the social networking system 106 via the network 104. In another embodiment, a client device 102 interacts with the social networking system 106 through an application programming interface (API) that runs on the native operating system of the client device 102, such as IOS® or ANDROID™.

A social networking system user may use several different client devices 102 to interact with the social networking system 106. For example, a user may use a desktop computer to interact with the social networking system 106 at home and a smart-phone to interact with the social networking system while traveling. In addition, multiple users may use the same client device 102 to interact with the social networking system 106.

The client devices 102 are configured to communicate via the network 104, which may comprise any combination of local area and/or wide area networks, using both wired and wireless communication systems. In one embodiment, the network 104 uses standard communications technologies and/or protocols. Thus, the network 104 may include communication links using technologies such as Ethernet, 802.11, worldwide interoperability for microwave access (WiMAX), 3G, 4G, CDMA, digital subscriber line (DSL), etc. Similarly, the networking protocols used on the network 104 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 104 may be represented using technologies and/or formats including hypertext markup language (HTML) or extensible markup language (XML). In addition, all or some of the communication links can be encrypted using conventional encryption technologies such as secure sockets layer (SSL), transport layer security (TLS), and Internet Protocol security (IPsec). The third party server 108 may be coupled to the network 104 for communicating with the social networking system 106, which is further described below in conjunction with FIG. 1B.

Figure 1B:
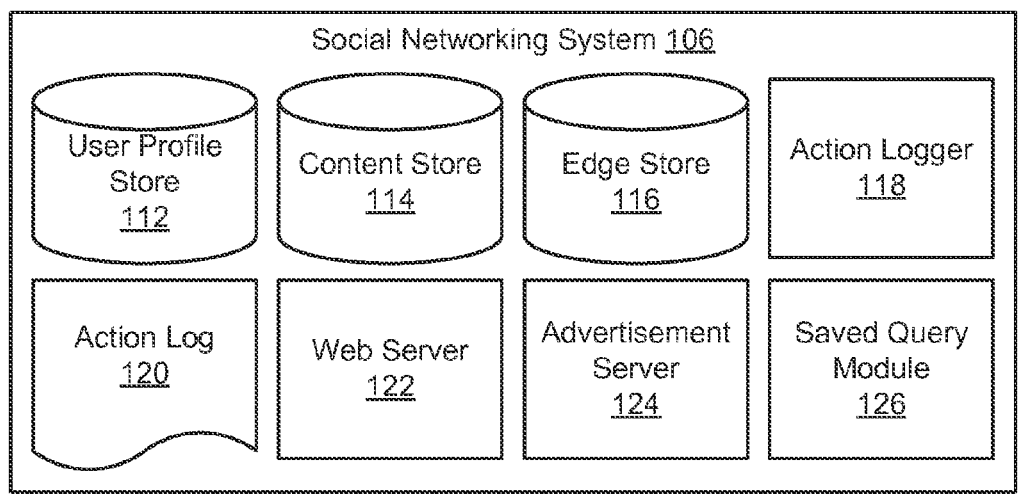
FIG. 1B is an example block diagram of an architecture of the social networking system, according to one embodiment.

FIG. 1B is one embodiment of an architecture of the social networking system 106. In the embodiment shown by FIG. 1B, the social networking system 106 includes a user profile store 112, a content store 114, an edge store 116, an action logger 118, an action log 120, a web server 122, an advertisement server 124, and a saved query module 126. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 106 is associated with a user profile, which is stored in the user profile store 112. A user profile includes declarative information about the user that was explicitly provided by the user, and may also include information inferred by the social networking system 106. In one embodiment, a user profile includes multiple data fields, with each data field describing one or more attributes of the corresponding user of the social networking system 106. Examples of information stored in a user profile includes biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 106 displayed in an image. A user profile in the user profile store 112 may also maintain references to actions by the corresponding user performed on content items in the content store 116 and stored in the action log 122 and references to connections to other users maintained by the edge store 118.

While user profiles in the user profile store 112 are frequently associated with individuals, allowing people to interact with each other via the social networking system 106, user profiles may also be stored for entities such as businesses or organizations. This allows an entity to establish a presence on the social networking system 106 for connecting and exchanging content with other social networking system users. The entity may post information about itself, about its products or provide other information to users of the social networking system 106 using a brand page associated with the entity's user profile. Other users of the social networking system 106 may connect to the brand page to receive information posted to the brand page or to receive information from the brand page. A user profile associated with the brand page may include information about the entity itself, providing users with background or informational data about the entity associated with the brand page.

A user profile may also store a user profile list that defines a list of other user profiles. The user profile list can be created and updated by the user or automatically created and updated by the social networking system 106. For example, a user creates and updates a list of user profiles belonging to the user's close friends, family members, or co-workers. In another example, the social networking system 106 automatically creates and updates a list of users that attended the same university as the user. A user profile list may be used to identify content items associated with users on the user profile list for presentation to the user, allowing the user to more easily interact with the users on the user profile list.

The content store 114 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 106, such as status updates, photos, events, groups or applications. In some embodiments, objects are received from third-party applications, which may be separate from the social networking system 106. Content "items" represent single pieces of content that are presented to social networking system users. Presenting content items to users increases user interaction with the social networking system 106 by encouraging users to post content items for presentation, increasing the interaction of users with each other and increasing the frequency with which users interact within the social networking system 106. In addition to the content item, a content object in the content store 114 may also include information about the content item. The information may include, for example, a geographic location where the content item was created or a timestamp for the content item.

The edge store 116 stores information describing connections between user profiles and other objects on the social networking system 106 as edges. Some edges may be defined by users, allowing users to specify their relationships with other users by generating edges between their user profiles with the user profiles of the other users. For example, users may generate edges with other user profiles that parallel the users' real-life relationships, such as friends, co-workers, partners, and so forth. Other edges are generated when users interact with objects in the social networking system 100, such as expressing interest in a page on the social networking system 106, becoming a member of a group, sharing a link with other users of the social networking system 106, and commenting on posts made by other users of the social networking system 106.

The edge store 116 stores information describing connections between user profiles and other objects on the social networking system 106 as edges. Some edges may be defined by users, allowing users to specify their relationships with other users by generating edges between their user profiles with the user profiles of the other users. For example, users may generate edges with other user profiles that parallel the users' real-life relationships, such as friends, co-workers, partners, and so forth. Other edges are generated when users interact with objects in the social networking system 100, such as expressing interest in a page on the social networking system 106, becoming a member of a group, sharing a link with other users of the social networking system 106, and commenting on posts made by other users of the social networking system 106.

The edge store 116 includes information describing an edge, such as affinity values for objects, groups, interests, and other user profiles. Affinity values may be computed by the social networking system 106 over time to approximate a user's affinity for an object, group, interest, and other user profiles in the social networking system 106 based on the actions performed by the user. Computation of affinity is further described in U.S. patent application Ser. No. 12/978, 265, filed on Dec. 23, 2010, which is hereby incorporated by reference in its entirety. In one embodiment, multiple interactions between a user and a specific object may be stored as a single edge in the edge store 116; alternatively, each interaction is stored as a separate edge. In some embodiments, connections between user profiles may be stored in the user profile store 112, or the user profile store 112 may access the edge store 116 to determine connections between user profiles.

The action logger 118 receives communications about user actions on and/or off the social networking system 106 and populates the action log 120 with information describing these actions. Examples of actions include adding a connection to another user, sending a message to another user, uploading an image, reading a message from another user, viewing content associated with another user, attending an event posted by another user, among others.

The social networking system 106 uses the action log 120 to track user actions on the social networking system 106, as well as on external websites that communicate information to the social networking system 106. Users may interact with various objects on the social networking system 106, including commenting on posts, sharing links, and checking-in to physical locations via a mobile device, accessing content items or other interactions. Information describing these actions is stored in the action log 120. Additional examples of interactions with objects on the social networking system 106 included in the action log 120 include commenting on a photo album, communications between users, becoming a fan of a musician, adding an event to a calendar, joining a group, becoming a fan of a brand page, creating an event, authorizing an application, using an application and engaging in a transaction. Additionally, the action log 120 records a user's interactions with advertisements on the social networking system 106 as well as other applications operating on the social networking system 100. In some embodiments, each entry in the action log 120 also includes an identifier for the client device 102 that was used to perform the action. In some embodiments, data from the action log 120 is used to infer interests or preferences of the user, augmenting the interests included in the user profile and allowing a more complete understanding of user preferences.

The action log 120 may also store user actions taken on external websites. For example, an e-commerce website that primarily sells sporting equipment at bargain prices may recognize a user of a social networking system 106 through social plug-ins that enable the e-commerce website to identify the user of the social networking system 106. Because users of the social networking system 106 are uniquely identifiable, third party servers 104, such as this sporting equipment retailer, may use the information about social networking system users accessing content from a third party server 104. The action log 120 records data about these users, including webpage viewing histories, advertisements that were engaged, purchases made, and other patterns from shopping and buying.

Data maintained by the user profile store 112, the content store 114, the edge store 116, and the action log 120 are collectively referred to as a "social graph." At a high level, the user profiles, groups, and content items form nodes in the social graph, and edges connect the nodes. Edges between nodes may be based on connections described in the edge store 116 or actions stored in the action log 120. In some embodiments, the social graph includes additional types of nodes and edges that are not explicitly described above with reference to the user profile store 112, the content store 114, the edge store 116, and the action log 120.

The web server 122 links the social networking system 106 via the network 104 to the one or more client devices 102, as well as to the one or more third party servers 108. The web server 124 serves web pages, as well as other web-related content, such as JAVA®, FLASH®, XML and so forth. The web server 122 may receive and route messages between the social networking system 106 and client devices 102, for example, instant messages, queued messages (e.g., email), text and SMS (short message service) messages, or messages sent using any other suitable messaging technique. A user may send a request to the web server 122 to upload information, for example, profile information to be stored in the user profile store 112, images or videos to be stored in the content store 114, or requests to generate new edges to connect with user profiles, groups, or content items. Additionally, the web server 122 may provide API functionality to send data directly to native client device operating systems, such as IOS®, ANDROID™, WEBOS® or RIM.

The advertisement server 124 presents advertisements to users through the social networking system 106, for example as stories in a user's newsfeed. The advertisement server 124 may additionally or alternatively send advertisements for display to users through external applications authorized to access to a user's identification on the social networking system 106. For example, a user may log in to the social networking system 106 through a native application on a smart phone. The native application may request advertisements from the social networking system 106, and the advertisement server 124 identifies and delivers advertisements to the native application. In some embodiments, the advertisement server 124 delivers targeted advertisements by comparing information associated with a user from one or more of the user profile store 112, the content store 114, the edge store 115, and the action log 120 to targeting criteria associated with advertisements. If the information associated with the user satisfies one or more targeting criteria associated with an advertisement, the user is eligible to be presented the advertisement. Examples of information associated with a user compared to targeting criteria include information in the user's profile, affinities between the user and other users or objects, and content items with which the user previously interacted. In these embodiments, the advertisement server 124 may also perform targeting based on a user's saved queries, as described below with reference to FIG. 2A.

The saved query module 126 maintains saved queries and a list of objects matching each saved query. For example, if the user performs a search for "Harvey Mudd students who like Taylor Swift," the saved query module 126 creates and maintains a list of user profiles including information identifying users as students of Harvey Mudd College that are connected to a brand page associated with Taylor Swift. Operation of the saved query module 126 is described in detail below with reference to FIGS. 2A-2C.

In one embodiment, the saved query module 126 creates the list of objects matching a saved query by storing an identifier for the saved query in a reverse index. In this embodiment, the saved query module 126 extracts objects from actions received by the action logger 120 and checks the reverse index to determine whether an object extracted from the action matches an existing saved query. For example, if a new action recorded by the action logger 118 creates a connection between the brand page associated with Taylor Swift and a new Harvey Mudd student, the structured query module 216 adds the profile of the new Harvey Mudd student to the list of objects matching the previously described saved query and notifies the user providing the saved query that a new result has been found. Thus, this embodiment allows a user to automatically receive a notification when an object matches the saved query. Operation of this embodiment of the saved query module 126 is described in detail below with reference to FIG. 2A.

In another embodiment, the saved query module 126 creates the list of objects by performing a direct search the social graph (e.g., by checking an index of the social graph) to find objects matching the saved query. In this embodiment, the saved query module 126 may update the list of objects matching a saved query by performing the direct search at regular time intervals. Operation of this embodiment is described in detail below with reference to FIG. 2C.

Figure 2B:
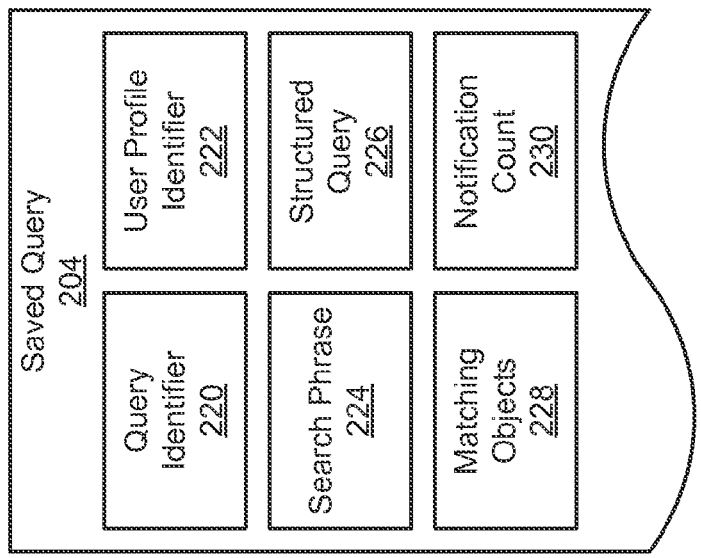
FIG. 2B is a block diagram illustrating components of a saved query, according to one embodiment.
Figure 2A:
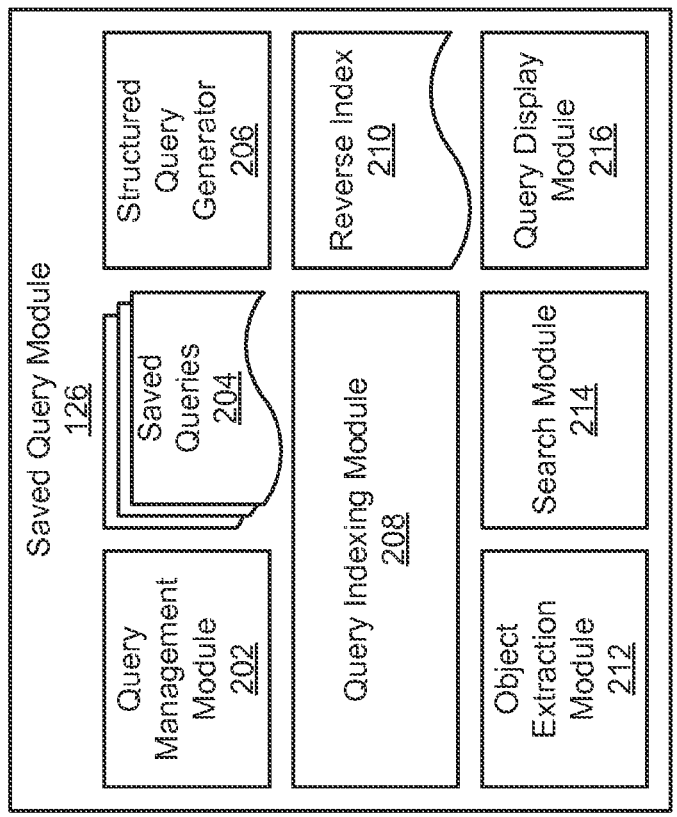
FIG. 2A is block diagram of a saved query module of the social networking system, according to one embodiment.

FIG. 2A is block diagram of one embodiment of the saved query module 126. In the embodiment shown by FIG. 2A, the saved query module 126 includes a query management module 202, one or more saved queries 204, a structured query generator 206, a query indexing module 208, a reverse index 210, an object extraction module 212, a search module 214, and a query display module 216. In other embodiments, such as the embodiment of FIG. 2C, the saved query module 126 may include additional, fewer, or different components, and the functionality of the structured query module may be distributed among its components in a different manner.

The query management module 202 receives a search phrase from the user (e.g., via the web server 122) and creates a new saved query 204. A block diagram of an example saved query 204 is shown in FIG. 2B, and for ease of description, the components 220, 222, 224, 226, 228, 230 of the saved query 204 are described below in conjunction with the description of the structured query module 126.

After creating a saved query 204, the query management module 202 generates a unique identifier 220 for the saved query 204 and adds a user profile identifier 222 to the saved query 204. The user profile identifier 222 identifies the profile of the user from which the search phrase was received. In one embodiment, the query management module 202 also stores the search phrase 224 in the saved query 204.

The structured query generator 206 receives a search phrase from the query management module 202 and generates a structured query by parsing the search phrase. As used herein, a "search phrase" is a string of text usable to find objects stored by the social networking system 106 subject to a set of constraints on information stored in the objects and on additional objects or users connected to the objects. A structured query is a data structure that stores the information and connections identified in the search phrase. For example, the structured query generator 206 receives the search phrase "Harvey Mudd students who like Taylor Swift" as described in the example above. From this search phrase, the structured query generator 206 creates a structured query for finding user profile objects including information identifying a student of Harvey Mudd College and connected to the brand page associated with Taylor Swift. Additional examples of search phrases and corresponding structured queries are described below with reference to FIGS. 3A-3C. A generated structured query 226 is stored by the structured query generator 206 as part of the saved query 204.

The query indexing module 208 adds the identifier 220 of a received saved query 204 to the reverse index 210. The reverse index 210 is a data structure allowing a module (e.g., the search module 214) to find identifiers 220 of saved queries 204 matching a given object maintained by the social networking system 106. An example data structure for implementing the reverse index 210 is described below with reference to FIG. 4.

The object extraction module 212 and the search module 214 operate together to determine whether a received action causes an object maintained by the social networking system 106 to match a saved query 204. The object extraction module 212 receives an action from the action logger 118 or from the action log 120 and extracts objects related to the action. For example, if the action is a user profile forming a connection to a brand page for a restaurant (e.g., by becoming a fan of the restaurant), the object extraction module 212 extracts the user profile and the brand page for the restaurant from the action. The object extraction module 212 may pass some or all of the extracted objects to the search module 214.

The search module 214 receives an object extracted from an action by the object extraction module 212 and determines whether the received object matches a saved query 204 in the reverse index 210. If the search module 214 determines that the received object matches a saved query 204, the search module 214 modifies the matching objects 228 of the saved query 204 to include a reference to the received object and increments the notification count 230 by one to indicate an additional object matching the saved query 204 has been found. In an embodiment where the reverse index 210 has the tree structure shown in FIG. 4, the search module 214 may traverse the tree comprising the reverse index 210 based on the received object's information and connection to other objects. A process for traversing a tree data structure is described in detail with reference to FIG. 4.

Continuing with the previous example, the search module 214 receives a user profile for a student at Harvey Mudd College named Michael Loy from the object extraction module 212 because a new connection was recently formed between Michael Loy's user profile and the brand page associated with Taylor Swift. After receiving this user profile, the search module 214 accesses the reverse index 210 and finds the identifier 220 for the saved query 204 described above. When the query identifier 220 is found, the search module 214 adds a link to Michael Loy's user profile to the matching objects 228 of the saved query 204 corresponding to the query identifier 220 and increments the notification count 230. Accordingly, the user that created the saved query 204 receives a notification that a new Harvey Mudd student likes Taylor Swift. The user creating the saved query may access the saved query 204 to see that the new student is Michael Loy from the use profile included in the matching objects 228 of the saved query 204.

The query display module 216 retrieves the objects matching a saved query 204 and displays the matching objects. In one embodiment, the query display module 216 displays the objects in chronological order according to the order in which the objects were added to the list of matching objects 228 of the saved query 204. For example, if a first matching object is added to the list of matching objects 228 at a later time than a second matching object, the first matching object may be displayed above the second matching object. In another embodiment, the query display module 216 orders the matching objects based on a likelihood of user interaction with the matching objects, so objects with which a user is more likely to interact are displayed in a more prominent position. In the preceding example, if more comments are associated with the second matching object, the query display module 216 may display the second matching object above the first matching object. In some embodiments, the query display module 216 also decreases the notification count 230 for a saved query 204 after detecting that the user has viewed one or more previously unviewed matching objects.

Figure 2C:
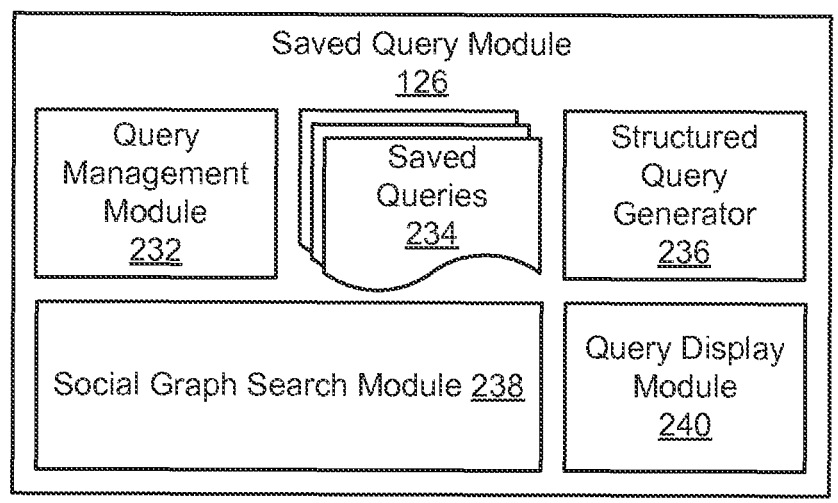
FIG. 2C is a block diagram of a saved query module of the social networking system, according to another embodiment.

FIG. 2C is block diagram of another embodiment of the saved query module 126. In the embodiment shown by FIG. 2C, the saved query module 126 includes a query management module 232, one or more saved queries 234, a structured query generator 236, a social graph search module 238, and a query display module 240. The functionality of the query management module 232, structured query generator 236, and query display module 240 is similar to the functionality of the corresponding components 202, 206, and 216 of the embodiment shown by FIG. 2A, so a detailed description of these components will be omitted for the sake of brevity. Similarly, the data in each of the saved queries 234 is similar to the data of the saved queries 204 of the embodiment shown by FIG. 2A.

The social graph search module 238 receives a structured query 226 from one of the saved queries 234 and periodically performs a search on the social graph to find new objects matching the structured query 226. In one embodiment, the social graph search module 238 maintains an index of objects in the social graph and performs the search by checking the index. In another embodiment, the module 238 checks a universal index that is also used to perform searches for other components of the social networking system 106. After finding the objects, the module 238 updates the matching objects of the saved query 204 to include references to objects that were not found in a previous search. The module 238 also increments the notification count 230 by the number of objects found to indicate that additional objects matching the saved query 204 has been found.

In one embodiment, the social graph search module 238 performs the search and update process for a saved query 234 at a fixed time interval (e.g., every 60 minutes). In another embodiment, the module 238 performs the search at variable time intervals by analyzing results obtained during previous searches. For example, the module 238 initially performs the search and update process for a saved query 234 at fixed 60 minute intervals. However, searches performed between 6 PM and 8 PM consistently yield more results than searches performed between 12 AM and 4 AM, so the module 238 performs the search and update process at a shorter time interval between 6 PM and 8 PM (e.g., every 15 minutes) and performs the process at a longer time interval between 12 AM and 4 AM (e.g., every 2 hours).

Generation of Structured Queries

Figure 3A:
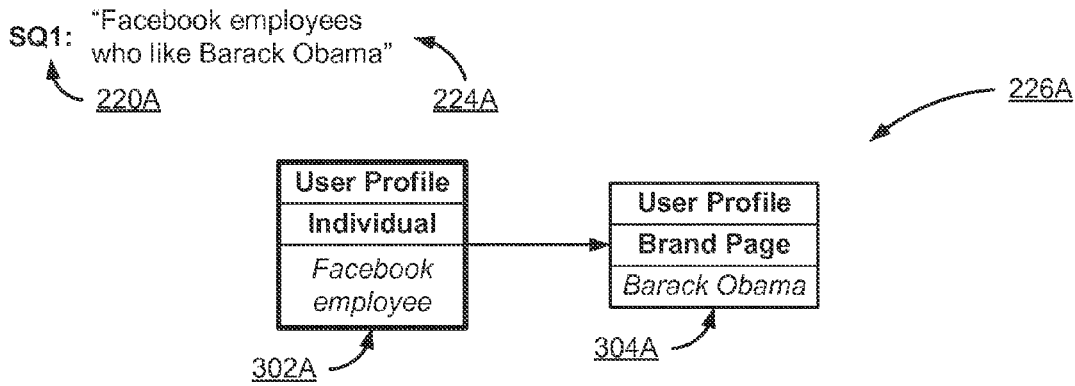
FIGS. 3A-3C illustrate examples of search phrases and corresponding structured queries, according to one embodiment.
Figure 3B:
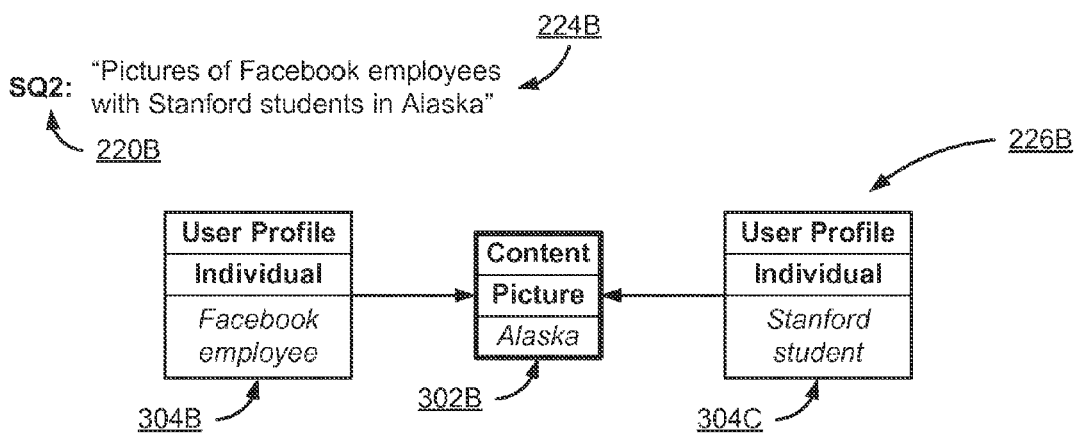
Figure 3C:
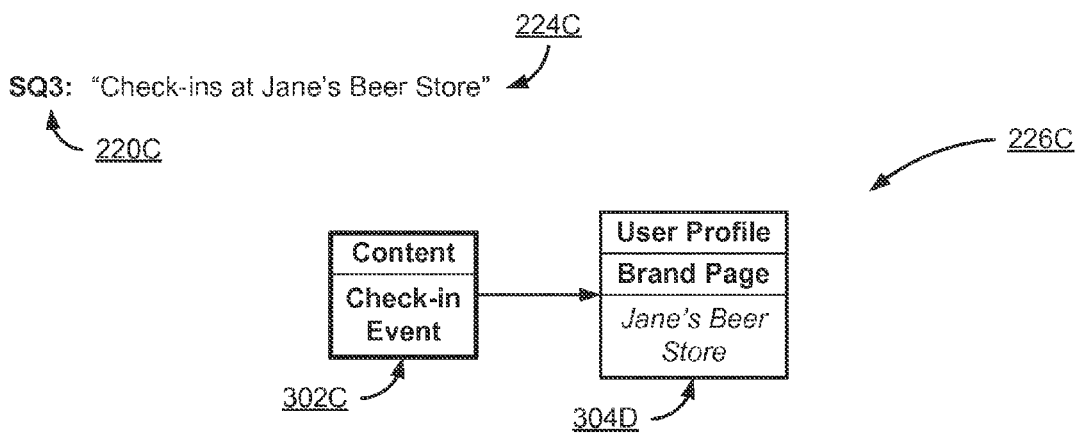

FIGS. 3A-3C illustrate examples of search phrases 224 and corresponding structured queries 226. In these examples, each structured query 226 includes a focal search object 302 (identified with a thicker outline) and one or more connected search objects 304. The focal search object 302 and the connected search objects 304 each specify an object type (shown in bold) and may optionally specify one or more attributes (shown in italics). As used herein, an object maintained by the social networking system 106 matches a focal search object 302 or connected search object 304 if the object has the same object type as the focal search object 302 or as the connected search object 304 and if the object also includes information matching every attribute in the focal search object 302 or in the connected search object 304. An object maintained by the social networking system 106 matches a structured query 226 in its entirety if the object matches the focal search object 302 and is also connected to objects matching the connected search objects 304.

In the example shown in FIG. 3A, the search phrase 224A is "Facebook employees who like Barack Obama," which identifies user profiles of individuals who are employed by Facebook and are connected to a brand page for Barack Obama. Thus, the structured query 226A for the search phrase 224A includes a single focal search object 302A and a single connected search object 304A. The object type for the focal search object 302A is an individual user profile, and the focal search object 302A includes an attribute indicating that the user profile belongs to a Facebook employee. The connected search object 304A is the brand page for Barack Obama.

A user profile object in the social graph matches the structured query 226A shown in FIG. 3A if the user profile includes information indicating that the user is a Facebook employee and if the user profile is also connected to the brand page for Barack Obama. Such a user profile matches the structured query 226A even if the profile includes additional information and/or additional connections to objects. For example, a user profile indicating a user is a Facebook employee and connected to the brand page for Barack Obama matches the structured query 226A even if the user profile also indicates the user is 112 years old and lives in Pyongyang, North Korea or if the user profile is also connected to a brand page for Mitt Romney.

In the example shown in FIG. 3B, the search phrase 224B is "Pictures of Facebook employees with Stanford students in Alaska." In the corresponding structured query 226B, the focal search object 302B is a picture with the attribute Alaska. The structured query 226B also includes two connected search objects 304B, 304C for user profiles identifying a Facebook employee and identifying a Stanford student, respectively. Thus, a picture maintained by the social networking system 106 matches the structured query 226B if the picture includes information indicating that it was taken in Alaska and is tagged with a user profile identifying a Facebook employee and a user profile identifying a Stanford student. The picture matches the structured query 226B even if it includes additional information (e.g., a timestamp) or additional connections (e.g., additional tagged user profiles).

In the example shown in FIG. 3C, the search phrase 224C is "Check-ins at Jane's Beer Store." The focal search object 302C for the corresponding structured query 226C is a check-in event without any attributes. The structured query 226C also includes a connected search object 304D for a brand page associated with Jane's Beer Store. Thus, a check-in event that is connected to the brand page associated with Jane's Beer Store matches the structured query 226C, even if the check-in event also includes additional information (e.g., a geographic location where the check-in event occurred) or additional connections (e.g., a connection to a user profile for the user who performed the check-in event).

Indexing of Query Identifiers

Figure 4A:
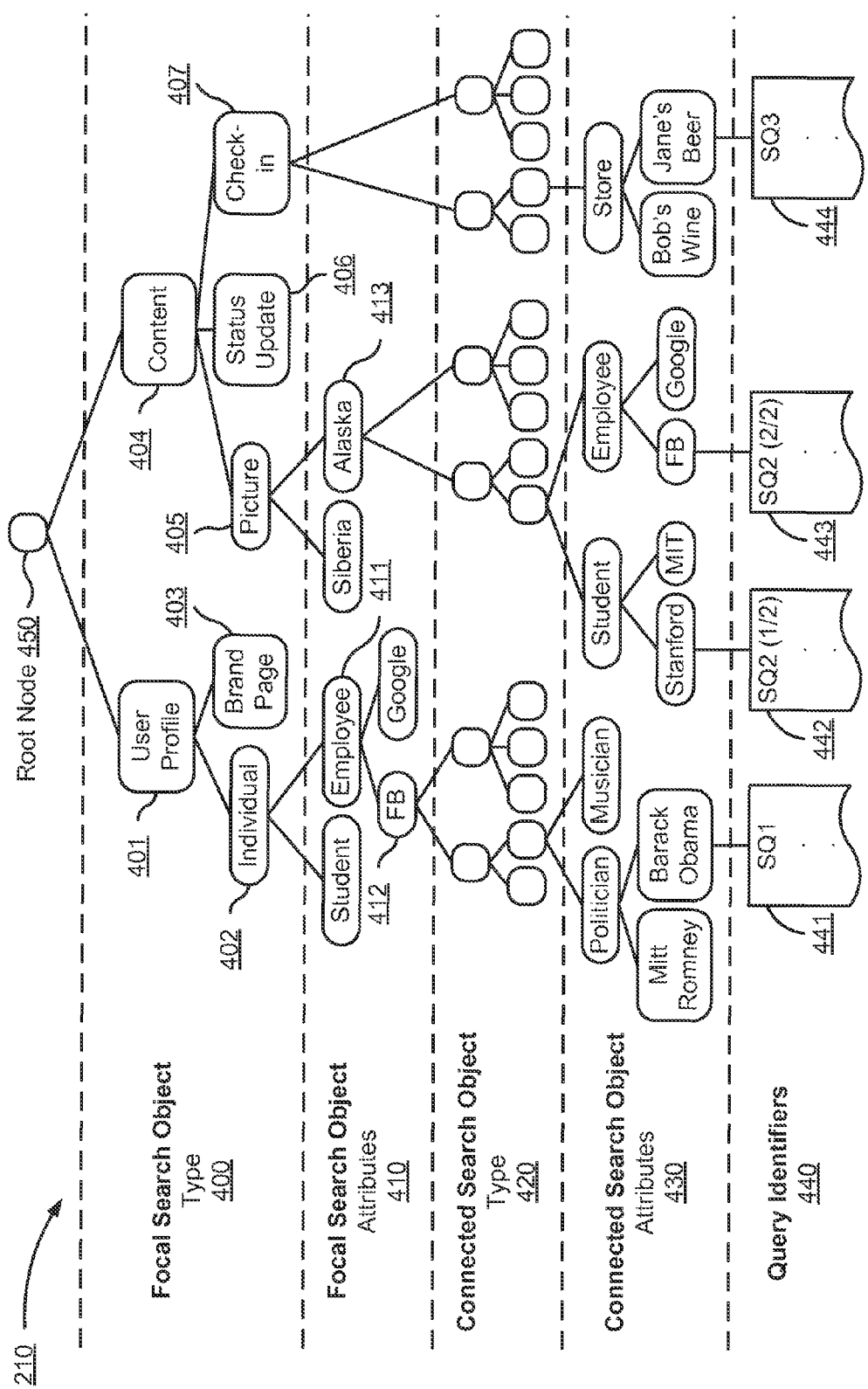
FIG. 4A is a diagram of a data structure for a reverse index, according to one embodiment.
Figure 4B:
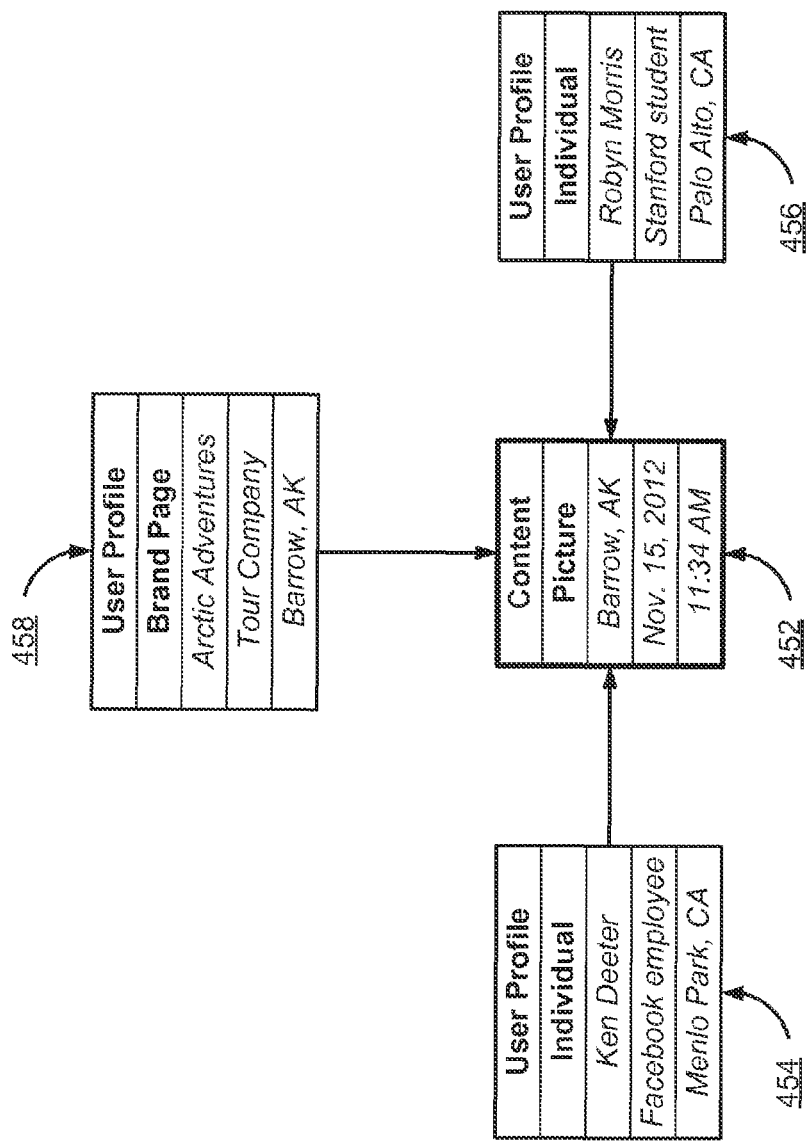
FIG. 4B illustrates an example object for traversing the reverse index, according to one embodiment.

FIG. 4A is a diagram of one embodiment for a data structure implementing a reverse index 210. In the illustrated embodiment, the reverse index 210 has a tree structure organizing query identifiers into four layers 400, 410, 420, 430, which are further described below. As used herein, a branch in the tree structure identifies a given node and all of the nodes in layers below the given node. Each branch may contain multiple smaller branches. For example, the branch beginning at the user profile node 401 includes two smaller branches starting at the individual node 402 and the brand page node 403. A level of the tree structure refers to the set of nodes that are linked to the root node 450 (i.e., the node at the top of the tree structure) with the same number of connections. For example, the first level of the tree shown in FIG. 4A consists of the user profiles node 401 and the content node 404, both of which are linked to the root 450 by a single connection.

The first layer 400 of the reverse index 210 organizes queries according to the object type of the focal search object. In the embodiment of FIG. 4A, the first layer 400 includes separate top-level branches for user profiles 401 and content objects 404, which are the two primary categories of object types. These top-level branches are divided into smaller branches for each type of user profile and each type of content object. For example, the branch for user profiles 401 includes smaller branches for individual user profiles 402 and brand page user profiles 403. Although only five types of focal search objects are shown in the embodiment of FIG. 4A, the first layer 400 may include additional focal search object types in other embodiments. For example, the branch for content items 404 may include additional branches for videos, links, and gaming application achievements in addition to the branches for pictures 405, status updates 406, and check-in events 407. In another embodiment, the top-level branches for user profiles 401 and content objects 404 are omitted, and the five object types are separate top-level branches. This configuration reduces the complexity of the reverse index 210 but may increase the time to traverse the tree.

The second layer 410 of the reverse index 210 organizes queries according to the attributes of the focal search object. Hence, the second layer 410 includes separate branches for different attributes. For example, the structured query 226A, shown in FIG. 3A, and having query identifier SQ1 is saved in the reverse index 210 under the branches for employee 411 and Facebook 412 because the focal search object 302A in the structured query 226A has the attribute "Facebook employee." In other embodiments, each attribute is represented as a single level instead of a hierarchy of two levels. For example, the attribute "Facebook employee" may be represented as a single node. If the focal search object for a structured query does not include any attributes, the path from the root to the corresponding query identifier does not include any nodes in the second layer 410. For example, the path from the root 450 to the identifier SQ3 for the structured query 226C shown in FIG. 3C does not pass through any nodes in the second layer 410.

The third layer 420 of the reverse index 210 organizes queries according to the object type of the connected search object. The hierarchy of the third layer 420 is similar to the hierarchy of the first layer 400. Thus, the third layer 420 may also include separate branches for the two main categories of object types (shown in the embodiment of FIG. 4A), or the third layer 420 may include separate branches for each object type without an initial separation into the two categories.

The fourth layer 430 of the reverse index 210 organizes queries according to attributes of the connected search object. The fourth layer 430 includes branches organized in a manner similar to those in the second portion 410. Thus, a detailed description of the branches in the fourth portion 430 is omitted for the sake of brevity.

Identifiers for saved queries are stored at the bottom of the tree 440 so that the path of nodes extending from the root node 450 to a query identifier at the bottom 440 includes nodes at one or more layers 400, 410, 420, 430 identifying the object types of the focal search object and at least one connected search object in the structured query corresponding to the query identifier. The path also includes nodes describing attributes of the focal search object and of the connected search object. Thus, if the search module 214 traverses the tree using data associated with a received object (e.g., according to the process described below) and reaches a query identifier, the saved query corresponding to the reached query identifier matches the received object.

If a structured query includes multiple connected search objects (e.g., the structured query 226B shown in FIG. 3B), the corresponding query identifier is stored in multiple positions at the bottom of the tree 440. Hence, a path of nodes through the tree describes each connected search object. For example, the identifier SQ2 for the query shown in FIG. 3B is stored in two positions 442, 443. The path of nodes leading to the first position 442 describes the connected search object 304C, while the path of nodes leading to the second position 443 describes the connected search object 304B. When a query identifier is stored in multiple positions, the corresponding saved query matches a received object if the search 218 reaches each of the multiple identifiers when traversing the reverse index 210. A process for traversing the list to find a query identifier in multiple positions is described in further detail below.

For the sake of brevity, some portions of the tree are omitted from FIG. 4A. The tree is likely to include many more branches when implemented on a large scale with many search queries. For example, the tree may also include branches below the nodes for brand pages 403 or status updates 406 for storing identifiers of search queries in which the focal search object is a brand page or a status update.

In one embodiment, when the search module 214 receives an object, the search module 214 traverses the tree to find query identifiers matching the received object. For ease of explanation, a process for traversing the tree will be described with reference to the example object 452 shown in FIG. 4B. The example object 452 is a picture taken in Barrow, Ak. at 11:34 AM on Nov. 15, 2012. Three user profiles 454, 456, 458 are tagged in the picture, and each user profile includes information about the corresponding individual or organization.

The search module 214 initially traverses the first layer 400 of the tree according to the object type of the received object 452. In this example, the received object 452 is a picture, so the search module 214 traverses the tree to the content node 404 and then to the picture node 405. The search module 214 traverses the second layer 410 of the tree by matching information in the received object 452 to the attributes in the next level of nodes. In the example shown in FIG. 4B, the picture object 452 includes information indicating a location where the picture was taken (i.e., Barrow, Ak.), and a timestamp indicating a date and time when the picture was taken. As the only matching attribute in the next layer of the tree is the node for Alaska 413, the search module 214 traverses the tree to the Alaska node 413. If the tree also included nodes for attributes matching the timestamp, the search module 214 would also access those nodes based on the timestamp of the received object 452. For example, if the next level included a node with the attribute November 2012 (e.g., because a user created a saved query for "Pictures taken in November 2012"), the search module 214 would also access this node.

The search module 214 then traverses the third layer 420 and the fourth layer 430 of the tree based on the types of the objects connected to the received object and the information in the objects connected to the received objects. Because the received object 452 is connected to three user profiles 454, 456, 458, the search module 214 iterates through the three profiles 454, 456, 458 and accesses the nodes in the third layer 420 and fourth layer 430 corresponding to each profile 454, 456, 458. The first profile 454 belongs to an individual named Ken Deeter and includes information indicating that Ken is a Facebook employee living in Menlo Park. Thus, the search module 214 accesses the nodes for user profiles, individuals, employees, and Facebook employees to arrive at an identifier SQ2 443 for the saved query shown in FIG. 3B. The second profile 456 belongs to an individual named Robyn Morris and indicates Robyn is a Stanford student living in Palo Alto. Thus, the search module accesses 214 accesses the nodes for user profiles, individuals, students, and Stanford students to arrive at another identifier SQ2 442 for the same saved query. Because the search module 214 arrives at both identifiers in the tree for the saved query shown in FIG. 3B, the search module 214 determines the received object matches this saved query and adds a link to the received object to the matching objects 228 of the saved query. The search module 214 also increments the notification counter 230 of the saved query to indicate an additional object matching the query has been identified.

The third profile 458 is a brand page belonging to a tour company called Arctic Adventures and includes information indicating that the tour company is based in Barrow, Ak. Thus, the search module 214 accesses the nodes for user profiles, brand pages, tour companies (not shown), and Barrow, Ak. (not shown). In the example tree shown in FIG. 4A, no query identifiers are shown at the end of this path of nodes. However, if the search module 214 arrived at another query identifier (e.g., because a user created a saved query for "Pictures posted by tour companies in Barrow"), a link to the received object 452 would also be added to the corresponding saved query.

Creation and Use of Saved Queries

Figure 5:
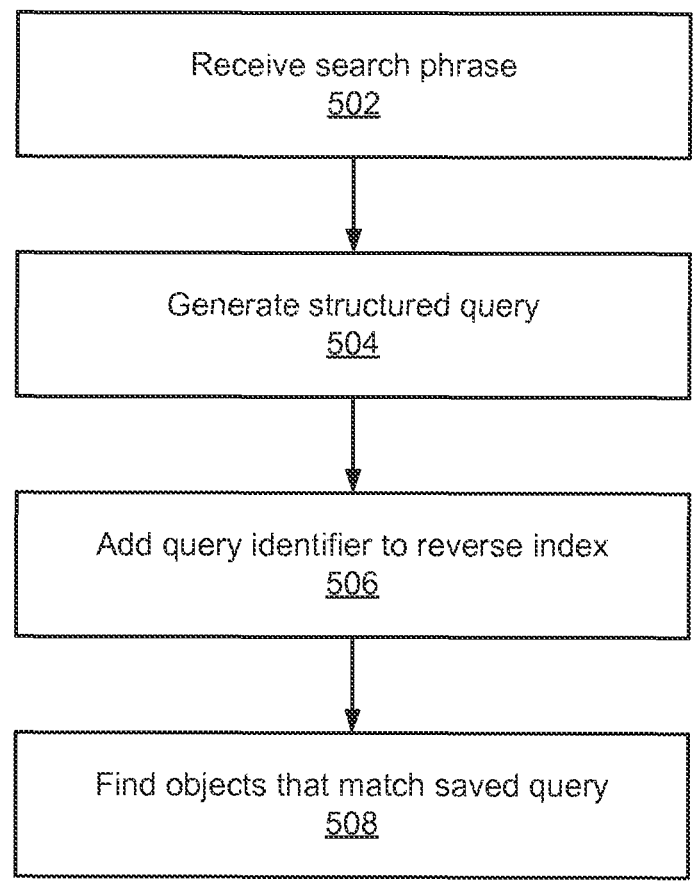
FIG. 5 is a flow chart of a process for receiving and processing a new search phrase, according to one embodiment.

FIG. 5 is a flow chart a process 500 for processing a search phrase, according to the embodiment described with reference to FIG. 2A. The web server 122 receives 502 a search phrase from a user. As described above with reference to FIGS. 2A-2B, the search phrase is a string of text usable to identify objects on the social graph subject to one or more constraints on the identified object and objects connected to the identified object. In one embodiment, the query management module 202 stores the search phrase 224 in a saved query 204 along with a unique query identifier 220 and an identifier 222 of the user profile for the user that submitted the search phrase.

The structured query generator 206 receives the search phrase and generates 504 a structured query based on the search phrase. For example, the structured query generator 206 retrieves the search phrase 224 from the saved query 204 or receives the search phrase directly from the web server 122 or the query management module 202. In one embodiment, the structured query generator 206 generates the structured query by parsing the text in the search phrase to extract a focal search object and at least one connected search object, as described with reference to FIGS. 3A-3C. The structured query generator 206 may also store the structured query 226 as part of the saved query 204.

The query indexing module 208 adds 506 the query identifier 220 to the reverse index 210. As described with reference to FIG. 4A, the reverse index 210 may have a tree structure organizing query identifiers 220 based on the corresponding structured queries. If the reverse index 210 does not include nodes corresponding to the object types and attributes of the focal search object and connected search object in the structured query, the query indexing module 208 adds the missing nodes so the reverse index 210 includes an appropriate position for the query identifier 220.

In the embodiment shown by FIG. 5, the saved query module 126 finds 508 existing objects maintained by the social networking system 106 matching the saved query. This allows the user to view objects matching the saved query without waiting for other users to perform actions causing objects to match the saved query. In one embodiment, the object extraction module 212 and the search module 214 iterate through recent actions in the action log 120 and determine whether recent actions cause an object to match the saved query. In another embodiment, the search module 214 iterates through objects associated with the user or with other users connected to the user to determine whether objects match the saved query. If matching objects are found, the search module 214 adds links to the matching objects in the matching objects 228 of the saved query. The search module 214 may also adjust the notification count 230 of the saved query to reflect the number of matching objects that were found.

If objects matching the saved query are found 508, the query display module 216 may display the matching objects to the user to view the results of the saved query. As described above with reference to the query display module 216, the matching objects may be displayed in chronological order, displayed according the likelihood of the user having an interest in the matching objects, or displayed in some other order. The query display module 216 may also decrease or reset the notification count 230 after the user views the matching objects.

Figure 6:
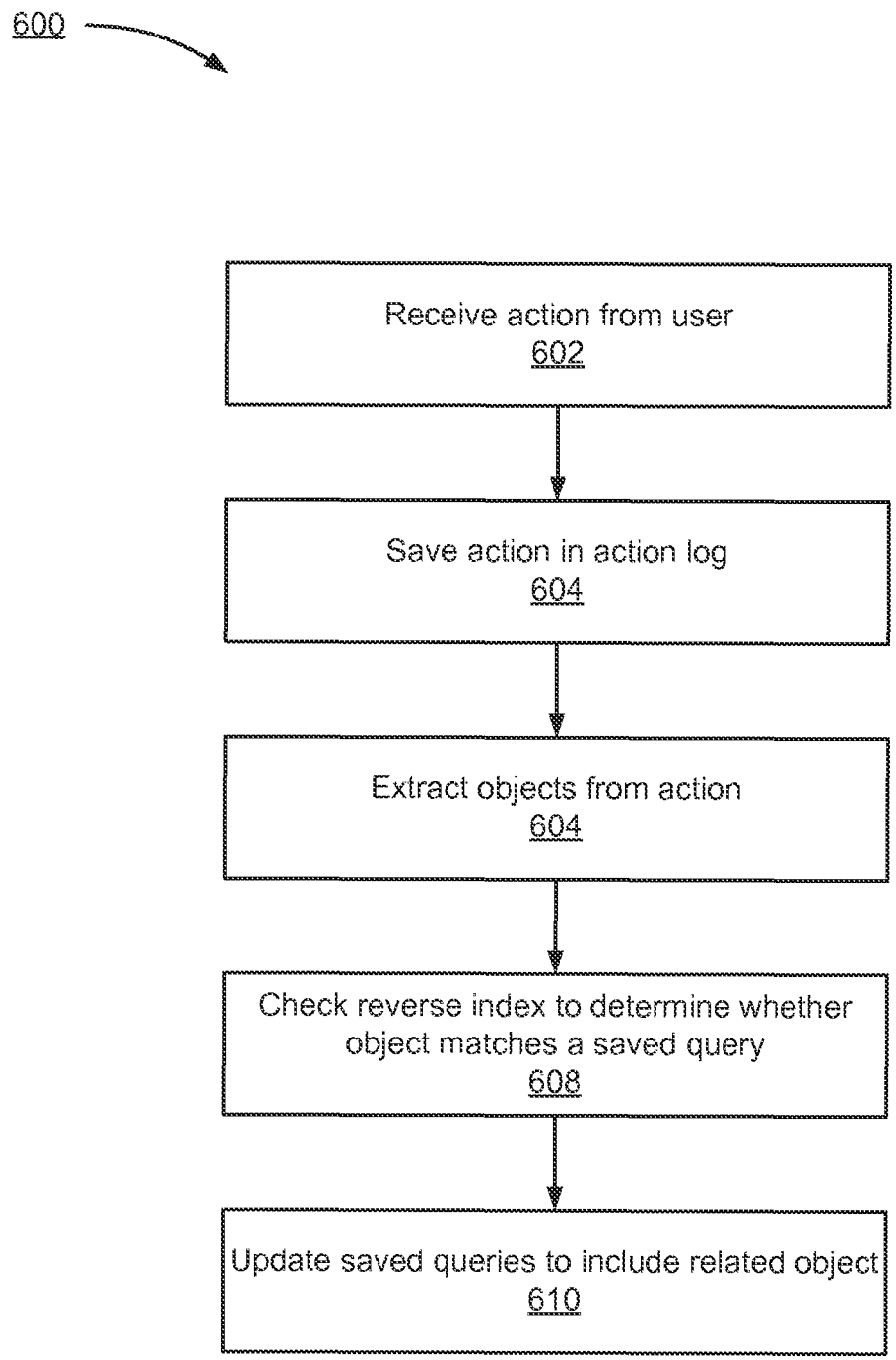
FIG. 6 is a flow chart of a process for determining whether an action causes an object to match a structured query, according to one embodiment.

FIG. 6 is a flow chart of a process 600 for determining whether an action causes an object to match a structured query, according to the embodiment of FIG. 2A. The web server 122 receives 602 an action from a user and sends the action to the action logger 118, which saves 604 the action in the action log 120. The object extraction module 212 receives the action (either from the action logger 118 or from the web server 122 or by retrieving the action from the action log 120) and extracts objects associated with the action. An action may add a new object to the content store 114, change information in an existing object in the content store 114, or create a new connection between two objects in the edge store 116. Hence, the action may create or change an object or its connections in a way that makes the object match a saved search query.

The search module 214 receives each extracted object and checks 608 the reverse index 210 to determine whether the object matches a saved query. In one embodiment, the reverse index 210 has a tree structure, and the search module 214 traverses the tree as described above in conjunction with FIG. 4B to identify saved queries matching the object. If the search module 214 determines that the object matches one or more saved queries, the search module 214 updates 610 the saved queries matching the object to include a link to the object. The search module 214 may also increment the notification count 230 of the saved queries 204 to indicate that an additional object has been found. Thus, the users creating the saved queries, which are identified by the user profile identifier 222 in each saved query, may receive a notification when an additional object matching the saved query is detected. The users may subsequently use the query display module 216 to view the additional matching object.

Figure 7:
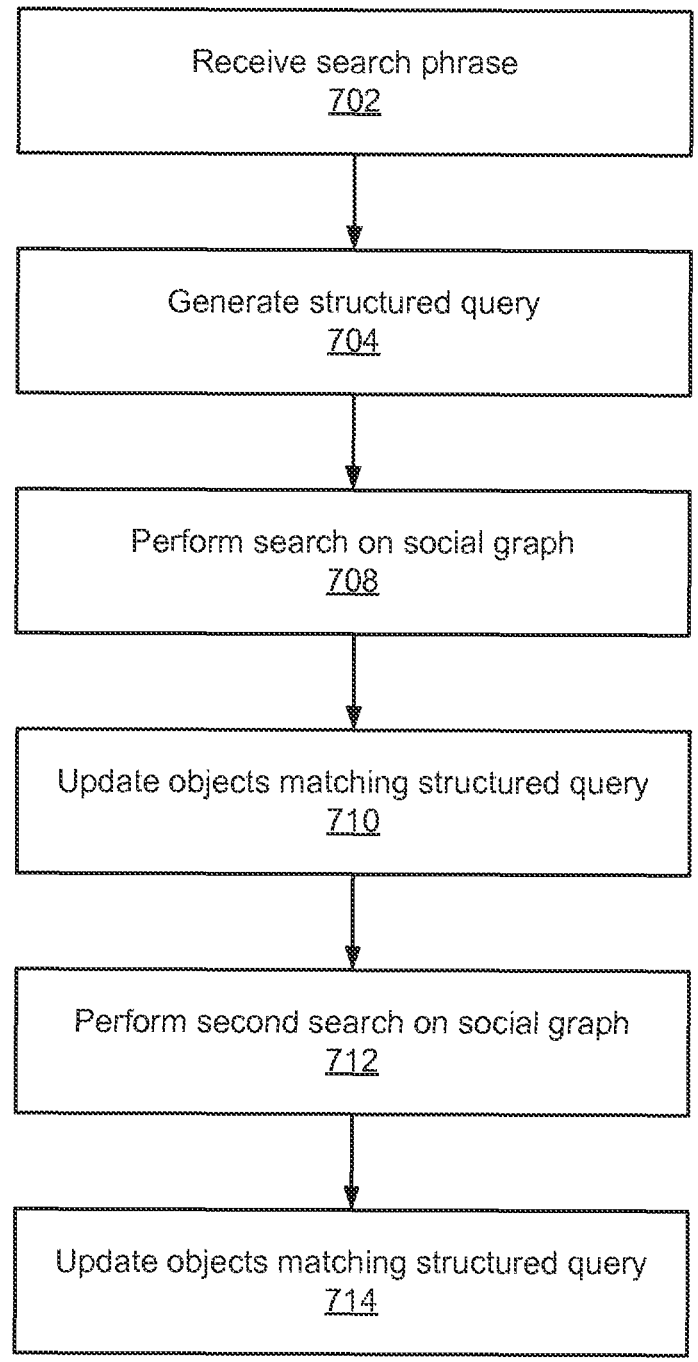
FIG. 7 is a flow chart of a process for processing a new search phrase and maintaining a list of matching objects for the corresponding saved query, according to one embodiment.

FIG. 7 is a flow chart of a process for processing a search phrase and maintaining a list of matching objects for the corresponding saved query, according to the embodiment described with reference to FIG. 2C. Similar to the process described with reference to FIG. 5, the web server 122 receives 702 a search phrase from a user, and the query management module 232 stores the search phrase 224 in a saved query 234 along with a unique query identifier 220 and an identifier 222 of the user profile for the user that submitted the search phrase. Next, the structured query generator 236 generates 704 a structured query based on the search phrase and stores the structured query 226 as part of the saved query 234.

The social graph search module 238 performs 708 a search on the social graph to find objects matching the structured query 226. As described above with reference to FIGS. 3A-3C, an object matches a structured query 226 in its entirety if the object matches the focal search object 302 and is also connected to objects matching the connected search objects 304. After finding the objects, the social graph search module 238 updates 710 the matching objects 228 portion of the saved query 234 to include links to the objects that were found. The module 238 may also increment the notification count 230 to reflect the number of links that were added to the matching objects 228. After the matching objects 228 portion is updated 710, the query display module 240 may send the objects for presentation to the user.

After a time interval, the social graph search module 238 performs a second search 712 on the social graph to find a second set of objects matching the structured query 226. Since objects may be modified or added to the social graph during the time interval, the second search may yield additional objects matching the structured query 226 that were not found during the first search. The social graph search module 238 updates 714 the matching objects 228 portion of the saved query 234 to include links to these additional matching objects. In addition, the social graph search module 238 may increment the notification count 230, and the query display module 240 may send the additional objects for presentation to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at an online system, a search phrase submitted in association with a user profile with the online system;
   identifying, by the online system, a first object with a first attribute that is connected to a second object in the online system with a second attribute from the search phrase;

generating, by the online system, a structured query corresponding to the first object with the first attribute that is connected to the second object in the online system with the second attribute;

performing, at a first time, a first search by the online system identifying a first set of objects with the first attribute that are each connected to another object in the online system having the second attribute;

generating, for the structured query, a list of links to the first set of objects;

performing, at a second time, a second search by the online system identifying a second set of objects with the first attribute that are each connected to another object having the second attribute; and updating the list of links for the structured query to include links to the second set of objects.

2. The method of claim 1, further comprising:
providing, after generating the list of links to include links to the first set of objects, the first set of objects to the user for display; and
providing, after updating the list of links to include links to the second set of objects, the second set of objects to the user.

3. The method of claim 1, further comprising:
responsive to updating the list of links to include links to the second set of objects, incrementing a notification count for the search phrase.

4. The method of claim 1, wherein performing the first search includes:
matching the first object or the second object included in the structured query with objects on a social graph maintained by the online system, the first object and the second object each having an object type, and
wherein a match of the first object or the second object with an object on the social graph comprises the first object or the second object having a same object type as the object on the social graph and information included in the object of the social graph matches the first attribute of the first object or the second attribute of the second object.

5. The method of claim 4, wherein the list of links comprises a plurality of links to objects matching the object type included in the search phrase and matching the second object.

6. The method of claim 4, further comprising:
updating a reverse index to include an identifier for the search phrase, the reverse index storing a plurality of search phrase identifiers based on the first object and the second object in the search phrases.

7. The method of claim 6, wherein the reverse index comprises a tree structure with branches for organizing structured query identifiers according to the object type in the structured queries.

8. The method of claim 7, wherein the reverse index further comprises branches for organizing structured query identifiers according to one or more attributes of the object type in the structured queries.

9. The method of claim 4, wherein the object type corresponds to at least one of an image, a page, a user profile, a post, or a status update, and wherein the subject is at least one of a person, a location, or an event.

10. A non-transitory computer readable storage medium storing one or more programs, the one or more programs comprising instructions, which when executed by a computing device, cause the computing device to:
receive a search phrase submitted in association with a user profile with a online system;
generate, from the search phrase, a structured query that includes a first object with a first object attribute that is connected to a second object in the online system;
store the structured query in association with the user profile;
perform, at a first time, a first search by the online system identifying a first set of objects matching the structured query;
generate, for the structured query, a list of links to the first set of objects;
perform, at a second time, a second search by the online system identifying a second set of objects matching the structured query; and
update the list of links for the structured query to include links to the second set of objects.

11. The non-transitory computer readable storage medium of claim 10, wherein the instructions further cause the computing device to:
parse the search phrase; and
extract the first object and the second object from the search phrase.

12. The non-transitory computer readable storage medium of claim 11, wherein the instructions when executed by the computing device further cause the computing device to:
responsive to updating the list of links to include the links to the second set of objects, increment a notification count for the search phrase.

13. The non-transitory computer readable storage medium of claim 10, wherein the instructions when executed by the computing device further cause the computing device to:
present the first set of objects to the user after generating the list of links to include links to the first set of objects; and
present the second set of objects to the user after updating the list of links to include links to the second set of objects.

14. The non-transitory computer readable storage medium of claim 10, wherein the first object or the second object corresponds to at least one of an image, a page, a user profile, a post, or a status update, and wherein the subject is at least one of a person, a location, or an event.

15. The non-transitory computer readable storage medium of claim 10, wherein the list of links comprises a plurality of links to objects matching the first object included in the search phrase and matching the second object.

16. The non-transitory computer readable storage medium of claim 10, wherein the instructions when executed by the computing device further cause the computing device to:
update a reverse index to include an identifier for the search phrase, the reverse index storing a plurality of search phrase identifiers based on the first object and the second object in the search phrases.

17. A method comprising:
receiving, at an online system, a search phrase submitted by a user having a user profile with the online system;
generating, by the online system, a structured query corresponding to a first object with a first attribute extracted from the search phrase that is connected in the online system to a second object with a second attribute;
storing the search phrase or the structured query in association with the user profile;
identifying, by the online system, one or more first objects by performing a first search at a first time, the one or more first objects matching the structured query;
generating, for the search phrase, a list of links to the one or more first objects;

identifying, by the online system, one or more second objects by performing a second search at a second time, the one or more second objects matching the structured query; and updating the list of links for the structured query to include links to the one or more second objects.

18. The method of claim 17, wherein the first object corresponds to at least one of an image, a page, a user profile, a post, or a status update, and wherein the subject is at least one of a person, a location, or an event.

19. The method of claim 17, further comprising:

providing, after generating the list of links to include links to the first objects, the one or more first objects to the user for display; and providing, after updating the list of links to include links to the second objects, the one or more second objects to the user.

* * * * *